United States Patent [19]
Lake

[11] Patent Number: 6,031,459
[45] Date of Patent: *Feb. 29, 2000

[54] WIRELESS COMMUNICATION DEVICES, RADIO FREQUENCY IDENTIFICATION DEVICES, AND METHODS OF FORMING WIRELESS COMMUNICATION DEVICES AND RADIO FREQUENCY IDENTIFICATION DEVICES

[75] Inventor: Rickie C. Lake, Eagle, Id.

[73] Assignee: Micron Technology, Inc., Boise, Id.

[*] Notice: This patent issued on a continued prosecution application filed under 37 CFR 1.53(d), and is subject to the twenty year patent term provisions of 35 U.S.C. 154(a)(2).

[21] Appl. No.: 09/120,599

[22] Filed: Jul. 22, 1998

[51] Int. Cl.$^7$ ..................................................... G08B 13/14
[52] U.S. Cl. ..................................... 340/572.8; 340/572.7; 340/825.34; 340/825.54; 361/737; 342/51
[58] Field of Search ............................... 340/572.8, 572.7, 340/572.5, 825.3, 825.34, 825.54, 825.31, 825.33; 156/213, 308.4; 29/855, 825, 829, 827, 600, 601; 342/51, 42, 44; 361/737, 761; 343/806, 845, 873; 257/673, 666, 735

[56] References Cited

U.S. PATENT DOCUMENTS

| | | | |
|---|---|---|---|
| 4,725,924 | 2/1988 | Juan | 361/398 |
| 5,264,990 | 11/1993 | Venambre | 361/761 |
| 5,497,140 | 3/1996 | Tuttle | 342/51 |
| 5,528,222 | 6/1996 | Moskowitz et al. | 340/572.7 |
| 5,682,296 | 10/1997 | Horejs, Jr. et al. | 361/737 |

OTHER PUBLICATIONS

MERECO Product Information—High Technology Materials—MERECO 1650 Series Flexible Epoxy Elastomers, pp. 2/10–3/10.

Standard Test Methods for Flexural Properties of Unreinforced and Reinforced Plastics and Electrical Insulating Materials (Metric), ASTM standard designation D 790M, American Society for Testing and Materials, P398–410.

*Primary Examiner*—Benjamin C. Lee
*Attorney, Agent, or Firm*—Wells, St. John, Roberts, Gregory & Matkin, P.S.

[57] ABSTRACT

The present invention provides wireless communication devices, radio frequency identification devices, and methods of forming wireless communication devices and radio frequency identification devices. According to one aspect of the invention, a wireless communication device includes a substrate; communication circuitry supported by the substrate; and a housing over at least a portion of the substrate and including a substantially rigid first housing portion; and a second housing portion configured to have increased flexibility with respect to the first housing portion.

61 Claims, 6 Drawing Sheets

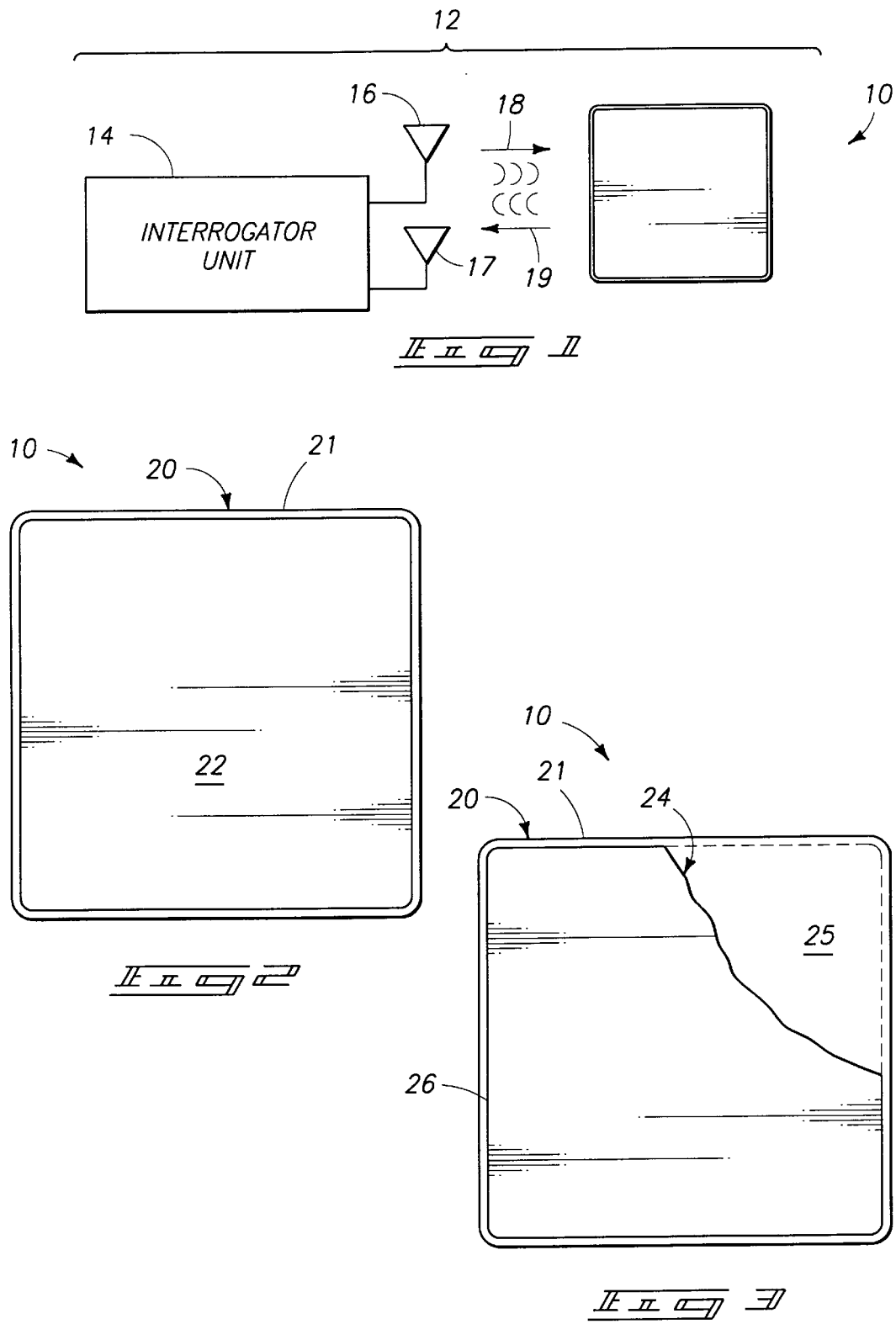

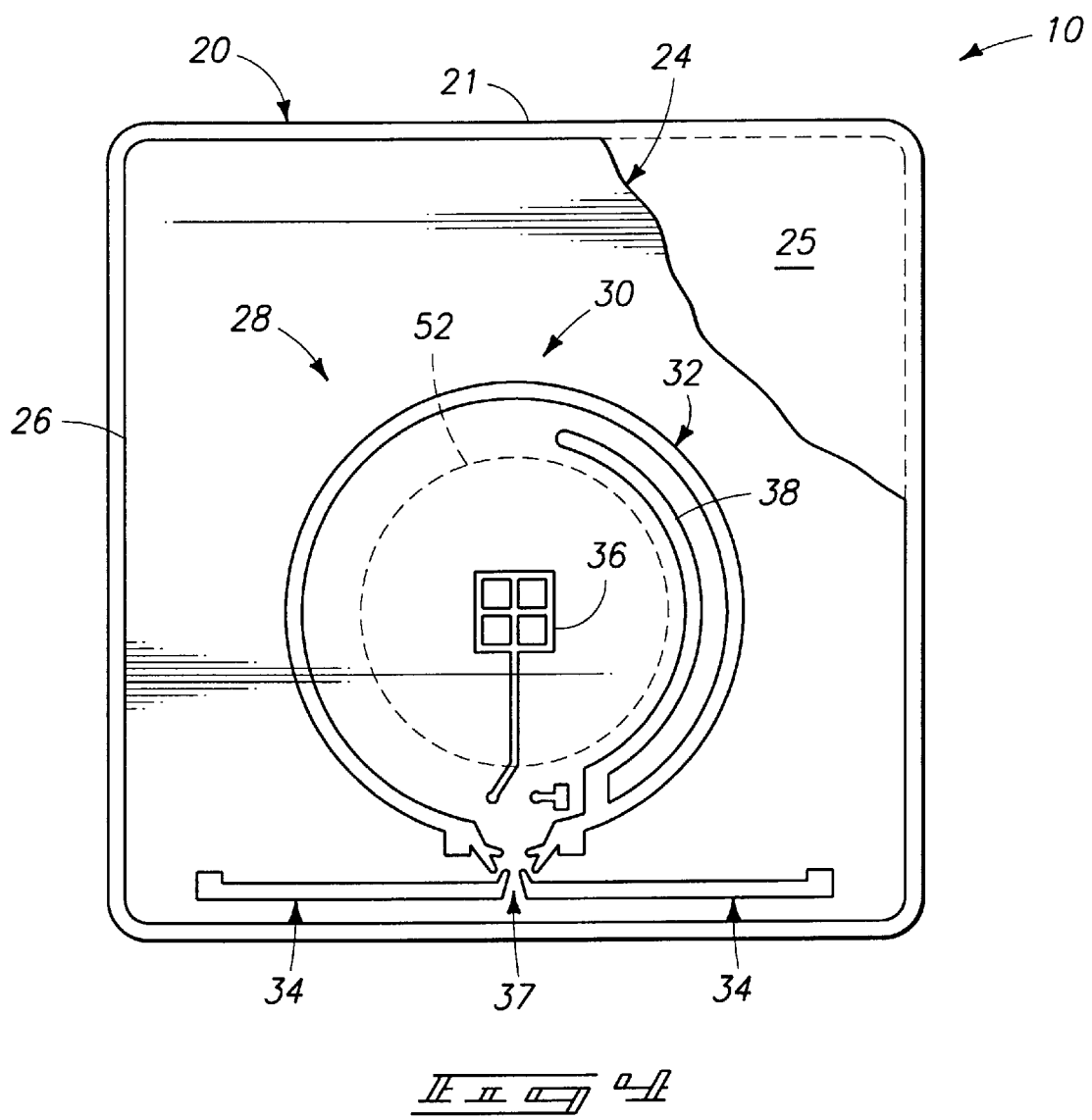

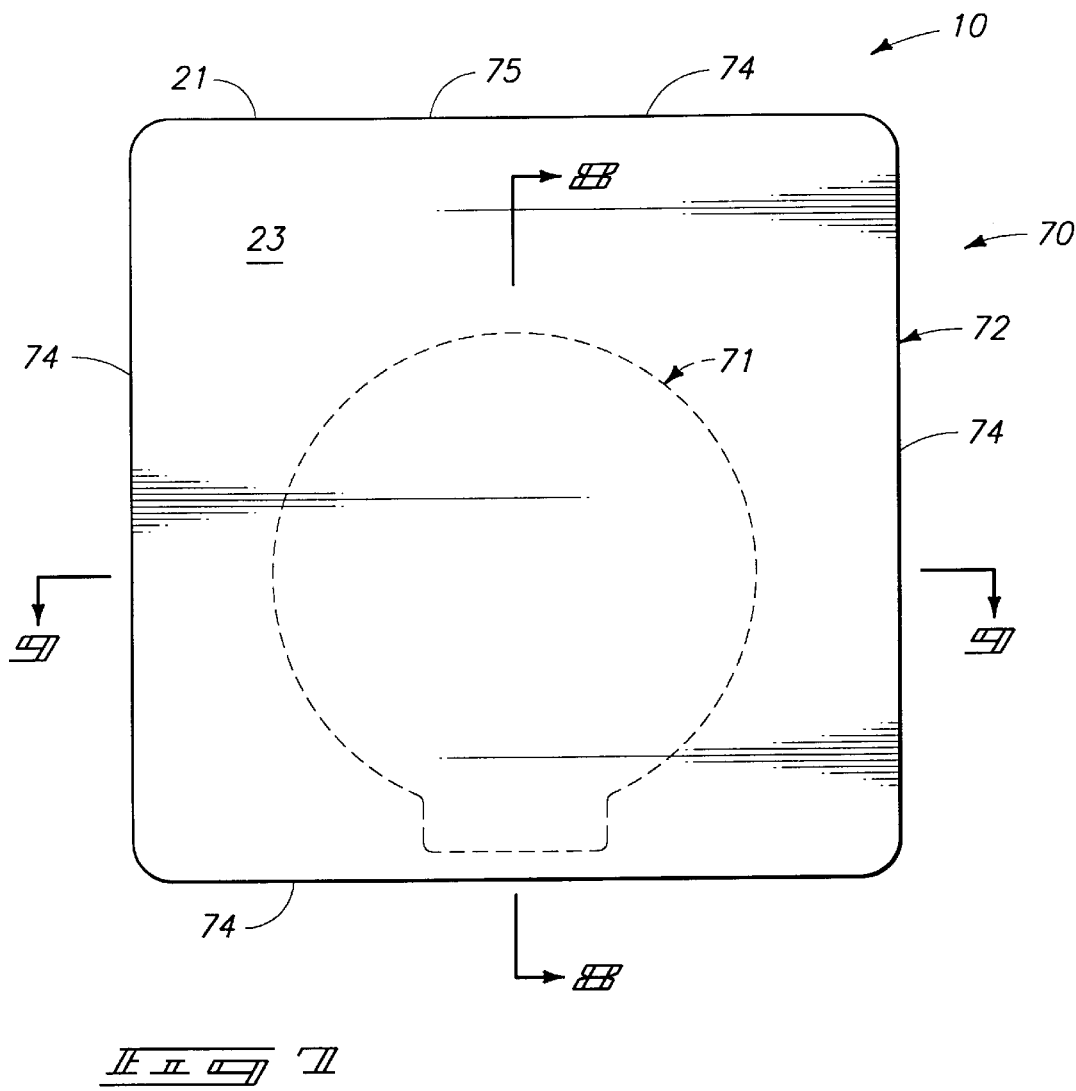
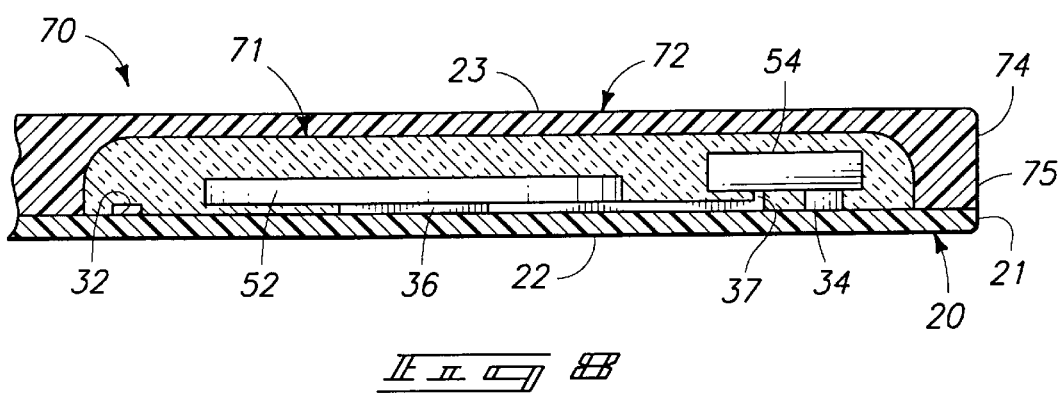

WIRELESS COMMUNICATION DEVICES, RADIO FREQUENCY IDENTIFICATION DEVICES, AND METHODS OF FORMING WIRELESS COMMUNICATION DEVICES AND RADIO FREQUENCY IDENTIFICATION DEVICES

TECHNICAL FIELD

The present invention relates to wireless communication devices, radio frequency identification devices, and methods of forming wireless communication devices and radio frequency identification devices.

BACKGROUND OF THE INVENTION

Electronic identification systems typically include two devices which are configured to communicate with one another. Preferred configurations of electronic identification systems are operable to provide such communications via a wireless medium.

One such configuration is described in U.S. patent application Ser. No. 08/705,043, filed Aug. 29, 1996, assigned to the assignee of the present application and incorporated herein by reference. This application discloses the use of a radio frequency (RF) communication system including an interrogator and a remote transponder, such as a tag or card. Plural transponders are provided in typical configurations.

The communication system can be used in various identification and other remote communication applications. The interrogator is configured to output a polling signal which may comprise a radio frequency signal including a predefined code. The transponders of such a communication system are operable to transmit, reflect or backscatter a reply signal responsive to receiving an appropriate polling signal.

More specifically, appropriate transponders are configured to recognize predefined codes. The transponders receiving an appropriate code subsequently output a particular reply signal which is associated with the transmitting transponder. Following transmission of the polling signal, the interrogator is configured to receive the reply signals enabling detection of the presence of corresponding transponders.

Such communication systems can be used in identification applications such as inventory or other object monitoring applications. a 1 For example, a remote identification device is attached to an object of interest. Responsive to receiving the appropriate polling signal, the remote identification device is equipped to output an appropriate reply signal. Generating the reply signal identifies the presence or location of the remote communication device and associated article or object.

Various housing configurations for remote transponders have been employed in conventional electronic identification systems. Typical housing configurations include rigid formations which contain the components operable to provide remote communications. Some conventional housing configurations have been found to have excess bulk and cumbersome or inflexible shapes with sharp corners. These configurations present issues related to comfort and/or safety in applications where the transponders are worn or used by personnel.

Therefore, there exists a need to provide improved housing configurations for the communication devices.

SUMMARY OF THE INVENTION

The present invention includes wireless communication devices and methods of forming wireless communication devices. Exemplary wireless communication devices include remote intelligent communication devices and radio frequency identification devices. The wireless communication devices are configured to communicate with an interrogator of a communication system in the described embodiment.

In one aspect of the invention, a wireless communication device comprises a substrate and communication circuitry supported by the substrate. The wireless communication device further comprises a housing over at least a portion of the substrate. The housing includes a substantially rigid first housing portion and a second housing portion configured to have increased flexibility with respect to the first housing portion. In certain configurations, the first housing portion has a flexural modulus within an approximate range of 3,500 MPa to 20,000 MPa, and the second housing portion has a flexural modulus within an approximate range of 20 MPa to 3,500 MPa.

The first housing portion can comprise a first encapsulant layer and the second housing portion can comprise a second encapsulant layer. The first housing portion is provided over at least a portion of the communication circuitry and the second housing portion is provided over at least a portion of the substrate in some configurations.

According to other aspects of the invention, communication circuitry of the wireless communication device can be partially implemented within an integrated circuit. The disclosed integrated circuit includes a processor, memory and transponder circuitry. The disclosed transponder circuitry is configured to output an identification signal responsive to receiving an interrogation signal. The wireless communication device can also include a power source configured to provide operational power to the integrated circuit. Circuitry configured to electrically connect components of the wireless communication device can comprise a conductive trace printed upon the substrate of the device. The substantially rigid first housing portion encapsulates the integrated circuit and power source in preferred embodiments disclosed herein.

Additional aspects of the present invention provide methods of forming a wireless communication device including providing a substrate and forming communication circuitry over the substrate. One aspect includes forming a housing over the substrate comprising a substantially rigid first housing portion and a second housing portion having increased flexibility with respect to the first housing portion. The methods can comprise forming the housing portions from different materials. Additionally, first and second housing portions of different thickness are also disclosed.

BRIEF DESCRIPTION OF THE DRAWINGS

Preferred embodiments of the invention are described below with reference to the following accompanying drawings.

FIG. 1 is a block diagram of a communication system including an interrogator and a wireless communication device embodying the invention.

FIG. 2 is a front elevational view of the wireless communication device.

FIG. 3 is a rear elevational view of the wireless communication device at an intermediate processing step.

FIG. 4 is a rear elevational view of the wireless communication device at an intermediate processing step downstream of the step shown in FIG. 3.

FIG. 7 is a rear elevational view of the wireless communication device.

FIG. 8 is a cross-sectional view, taken along line 8—8, of the wireless communication device shown in FIG. 7.

DETAILED DESCRIPTION OF THE PREFERRED EMBODIMENTS

Figure 5:
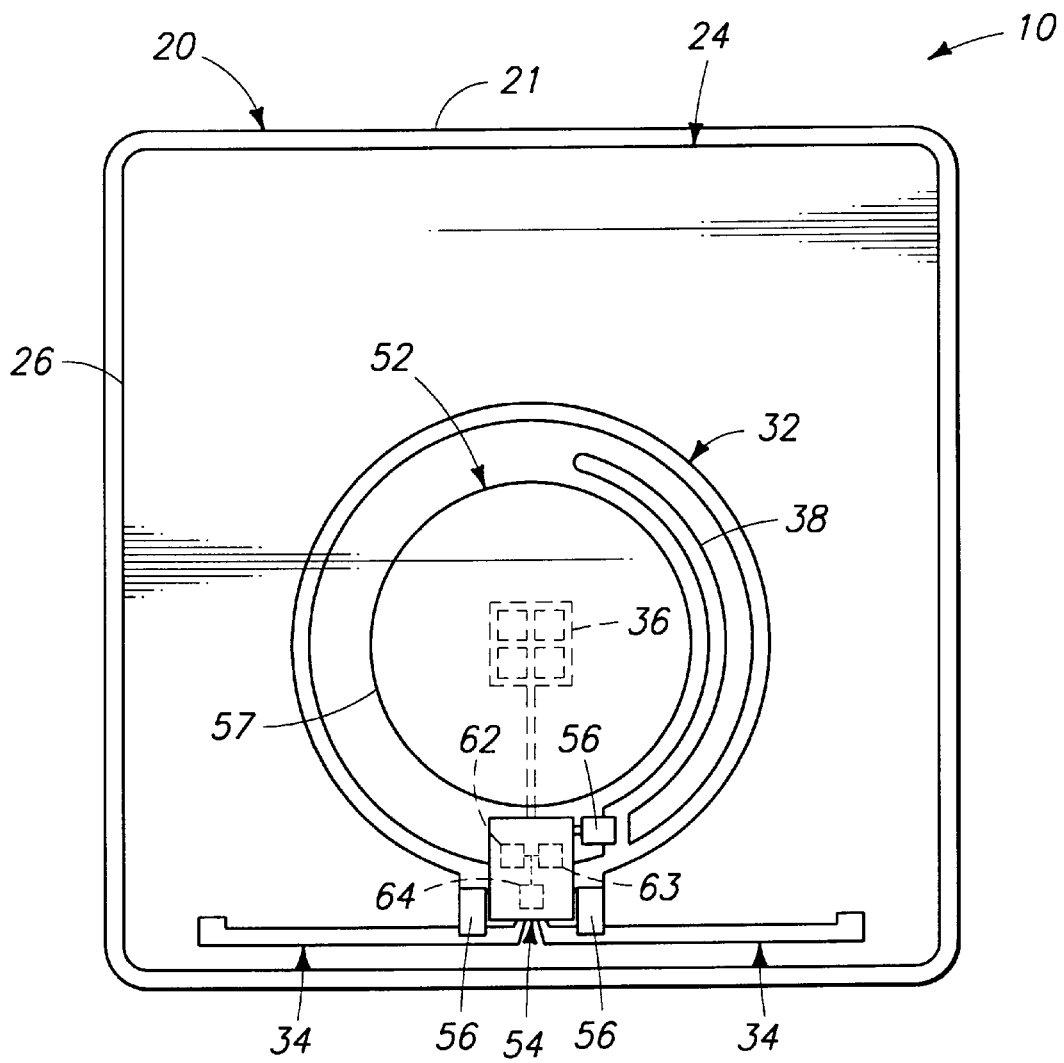
FIG. 5 is a rear elevational view of the wireless communication device at an intermediate processing step downstream of the step shown in FIG. 4.

This disclosure of the invention is submitted in furtherance of the constitutional purposes of the U.S. Patent Laws "to promote the progress of science and useful arts" (Article 1, Section 8).

Referring to FIG. 1, a communication system 12 is illustrated. Communication system 12 is configured in an electronic identification application in the described embodiment. Other configurations or applications are possible. The depicted communication system 12 comprises a wireless communication device 10 and an interrogator unit or interrogator 14 configured to communicate with device 10. The described wireless communication device 10 is fabricated in a card configuration (which includes tag or stamp configurations). Wireless communication device 10 is formed in other configurations in other embodiments.

Wireless communication device 10 comprises a radio frequency identification device (RFID) configuration or a remote intelligent communication device (RIC) in exemplary embodiments. Radio frequency identification devices are configured to output a radio frequency identification signal responsive to receiving an interrogation signal. Remote intelligent communication devices are capable of functions in addition to the identifying function of radio frequency identification devices. A preferred embodiment of remote intelligent communication devices includes a processor.

An exemplary interrogator 14 is described in detail in U.S. patent application Ser. No. 08/806,158, filed Feb. 25, 1997, assigned to the assignee of the present application and incorporated herein by reference. Wireless communication device 10 communicates via electromagnetic signals, such as radio frequency (RF) signals, with interrogator unit 14 in a preferred embodiment of communication system 12. Other communication media, such as infrared signals, are utilized by communication system 12 in other embodiments.

Interrogator 14 includes a transmit antenna 16 and a receive antenna 17. In an identification mode of operation, interrogator 14 is configured to output a forward link or interrogation signal 18 via antenna 16. In addition, interrogator 14 is configured to receive a reply link or identification signal 19 via antenna 17. Signals 18, 19 comprise microwave radio frequency signals in the described embodiment.

Referring to FIG. 2, one configuration of wireless communication device 10 is described. The illustrated wireless communication device 10 includes an insulative layer of supportive material or substrate 20. The term "substrate" as used herein refers to any supporting or supportive structure, including but not limited to, a supportive single layer of material or multiple layer constructions. Example materials for substrate 20 comprise polyester, polyethylene or polyimide film having a thickness of three to seven mils (thousandths of an inch). Substrate 20 is preferably flexible as illustrated below. Substrate 20 defines an outer lateral periphery 21 of device 10. A front surface 22 of device 10 is shown in FIG. 2. In the illustrated arrangement, front surface 22 of device 10 comprises a surface of substrate 20.

Referring to FIG. 3, substrate 20 includes a support surface 25 opposite front surface 22. An optional ink layer 24 is applied to support surface 25 of substrate 20 in preferred embodiments of the invention. A portion of ink layer 24 has been peeled away in FIG. 3 to reveal a portion of support surface 25. In other embodiments, plural ink layers 24 are provided upon support surface 25. Ink layer 24 enhances the appearance of device 10 and conceals internal components and circuitry provided therein. The illustrated ink layer 24 defines a periphery 26 inside substrate and device periphery 21.

Referring to FIG. 4, support surface 25 is provided to support components and circuitry formed in later processing steps over substrate 20. More specifically, communication circuitry 28 is provided over and supported by substrate 20. Communication circuitry 28 comprises a patterned conductive trace 30 and electrical components described below with reference to FIG. 5. In particular, communication circuitry 28 includes transponder circuitry in one embodiment.

Conductive trace 30 is formed or applied over substrate 20 and atop ink layer 24 upon support surface 25. Conductive trace 30 can be formed upon ink layer 24, if present, or upon support surface 25 of substrate 20 if no ink layer is provided. Alternatively, conductive trace 30 can be formed upon intermediate layers atop ink layer 24 if such are present.

A preferred conductive trace 30 comprises printed thick film (PTF). The printed thick film comprises silver and polyester dissolved into a solvent. One manner of forming or applying conductive trace 30 includes screen or stencil printing the ink on support surface 25 through conventional printing techniques to form circuitry. The printed thick film is preferably heat cured to flash off the solvent.

Conductive trace 30 defines transmit and receive antennas 32, 34 in one embodiment of the invention. Antennas 32, 34 are suitable for respectively transmitting and receiving wireless signals or RF energy in the described configuration. Antennas 32, 34 are coupled with integrated circuitry described below.

Transmit antenna 32 constitutes a loop antenna. Receive antenna 34 constitutes two elongated portions which extend in opposing directions. Other antenna constructions are possible. In particular, both transmit and receive operations are implemented with a single antenna in alternative embodiments of the present invention. In addition, the wireless communication device 10 can be configured for backscatter communications.

Conductive trace 30 additionally forms desired electrical connections with and between electronic components described below. The illustrated conductive trace 30 includes a first connection terminal 36 and a second connection terminal 38. Terminals 36, 38 are configured to couple with a power source (shown in phantom as a battery 52 in FIG. 4). Terminals 36, 38 are arranged to supply power to transponder circuitry from source 52 for providing wireless communications with interrogator 14. Conductive trace 30 also includes a grouping of connectors 37 for coupling with discrete components and integrated circuitry attached to device 10 in subsequent processing steps.

Referring to FIG. 5, one embodiment of wireless communication device 10 includes power source 52, integrated circuit 54, and plural capacitors 56. Power source 52, integrated circuit 54 and capacitors 56 are provided and mounted over support surface 25 and supported by substrate 20. The depicted power source 52 is disposed within transmit antenna 32 of wireless communication device 10.

Integrated circuit 54 can comprise a flip chip semiconductor device in one embodiment. Integrated circuit 54, including transponder circuitry, is coupled with printed circuitry comprising conductive trace 30 using plural connectors 37. Further, capacitors 56 are electrically coupled with integrated circuit 54 via connectors 37. Other discrete components such as resistors can be attached to communication device 10.

Power source 52 provides operational power to wireless communication device 10 and selected components therein, including integrated circuit 54. In the illustrated embodiment, power source 52 comprises a battery. In particular, power source 52 is preferably a thin profile battery which includes first and second terminals of opposite polarity. More particularly, the battery has a lid or negative (i.e., ground) terminal or electrode, and a can or positive (i.e., power) terminal or electrode.

Conductive epoxy is applied over desired areas of support surface 25 using conventional printing techniques, such as stencil or screen printing, to assist in component attachment. Alternately, solder or another conductive material is employed instead of conductive epoxy. Power source 52 is provided and mounted over substrate 20 using the conductive epoxy. In particular, power source 52 is conductively bonded with terminals 36, 38. Integrated circuit 54 and capacitors 56 are also provided and conductively bonded or otherwise mounted to connectors 37 over substrate 20 using the conductive epoxy.

Portions of communication circuitry 28 are implemented within integrated circuit 54. For example, in one embodiment, integrated circuit 54 includes a processor 62, memory 63, and transponder circuitry 64 (components 62, 63, 64 are shown in phantom in FIG. 5). An exemplary and preferred integrated circuit 54 is described in U.S. patent application Ser. No. 08/705,043, incorporated by reference above.

Transponder circuitry 64 of communication circuitry 28 is configured to provide wireless communications with interrogator unit 14. One embodiment of transponder circuitry 64 includes a transmitter and a receiver respectively operable to transmit and receive radio frequency signals. In particular, transponder circuitry 64 is operable to transmit or otherwise output identification signal 19 responsive to receiving interrogation signal 18 from interrogator 14.

In the described embodiment, processor 62 is configured to process the received interrogation signal 18 to detect a predefined code within interrogation signal 18. Responsive to the detection of an appropriate interrogation signal 18, processor 62 instructs transponder circuitry 64 to output identification signal 19. Identification signal 19 contains an appropriate code to identify the particular device 10 transmitting identification signal 19. Interrogation signal 18 and identification signal 19 are respectively received and transmitted using device 10.

First and second connection terminals 36, 38 are coupled to integrated circuit 54 by conductive epoxy and connectors 37 in accordance with a preferred embodiment of the invention. The conductive epoxy also electrically connects the first terminal of power source 52 to first connection terminal 36. In the illustrated embodiment, power source 52 is placed lid down such that the conductive epoxy makes electrical contact between the negative terminal of power source 52 and first connection terminal 36.

Power source 52 has a perimetral edge 57 defining the second power source terminal. In the illustrated embodiment, perimetral edge 57 defines the can of power source 52. Perimetral edge 57 is provided adjacent second connection terminal 38. In the illustrated embodiment, perimetral edge 57 of power source 52 is cylindrical. The depicted connection terminal 38 is arcuate having a radius slightly greater than the radius of power source 52 so that connection terminal 38 is closely spaced apart from perimetral edge 57 of power source 52.

Subsequently, conductive epoxy is dispensed relative to perimetral edge 57 and electrically connects perimetral edge 57 with connection terminal 38. The conductive epoxy connects the positive terminal of power source 52 to connection terminal 36. The conductive epoxy is then cured.

Referring to FIG. 6–FIG. 12, plural housing configurations 70 for plural embodiments of wireless communication devices 10 are illustrated. Housings 70 are provided over at least a portion of substrates 20 of corresponding devices 10. In the depicted embodiments, housings 70 are formed over the entire surfaces 25 of corresponding substrates 20. Housings 70 individually comprise a first housing portion 71 and a second housing portion 72 in the illustrated embodiments.

Figure 6:
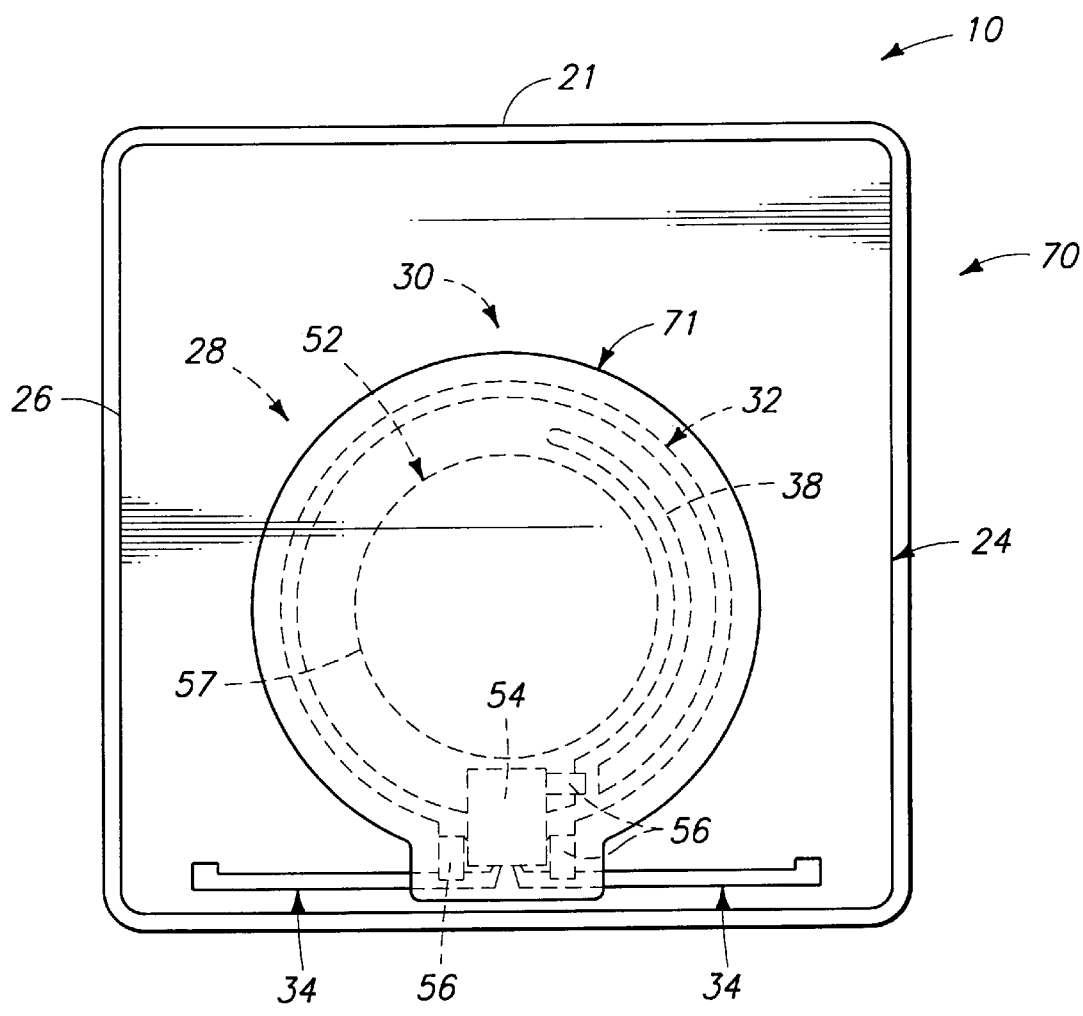
FIG. 6 is a rear elevational view of the wireless communication device at an intermediate processing step downstream of the step shown in FIG. 5.

In the embodiments of FIG. 6–FIG. 11, first housing portion 71 and second housing portion 72 comprise different first and second materials (only first housing portion 71 is shown in FIG. 6). In the embodiment depicted in FIG. 12, first housing portion 71 and second housing portion 72 comprise the same material but have different thicknesses.

Referring to FIG. 6, first housing portion 71 is shown formed over at least a portion of communication circuitry 28. First housing portion 71 forms a substantially rigid housing portion in the described embodiment. More specifically, following coupling of electronic components with conductive trace 30, first housing portion 71 is formed. First housing portion 71 can comprise a flowable material such as epoxy or polyurethane which is cured or otherwise set to a nonflowable and substantially rigid state.

First housing portion 71 comprises a first encapsulant layer in the depicted configuration. Exemplary materials for first housing portion 71 include epoxy number R1055-01 with hardener H5039 both available from Epic Resins, Inc., located in Palmyra, Wis. The encapsulant may be applied by any appropriate method including dispensing, transfer molding, stencil printing, etc. First housing portion 71 is provided over and encapsulates at least a portion of communication circuitry 28. More specifically, first housing portion 71 can be formed over and to encapsulate transmit antenna 32, power source 52, integrated circuit 54 (including transponder circuitry 64), connectors 37 and terminal connections 36, 38. In addition, first housing portion 71 is provided over a portion of antenna 34. More or less components or circuitry are covered or encapsulated by first housing portion 71 in other embodiments. Referring to FIG. 7, second housing portion 72 is formed over at least a portion of substrate 20 (not shown in FIG. 7). In the depicted embodiment, second housing portion 72 is provided over substantially the entire substrate 20. Second housing portion 72 comprises a second encapsulant layer which encapsulates first housing portion 71 in the depicted embodiment (see also FIG. 8). An exemplary material for second housing portion 72 includes Mereco #1650 Flexible Epoxy Elastomer, manufactured by Mereco Technologies Group, located in West Warwick, R.I. This exemplary material has a very low modulus of elasticity of 3,500 PSI (24 MPa). The materials comprising second housing portion 72 are dispensed, flowed and subsequently cured during formation of housing portion 72 according to one embodiment.

Once first housing portion 71 has cured, second housing portion 72 is formed over substrate 20 and first housing portion 71 according to the described embodiment. Second housing portion 72 is applied to the remaining portions of electronic device 10 not covered by first housing portion 71, and at least partially joins first housing portion 71 in the illustrated embodiment. Second housing portion 72 defines a surface 23 opposite surface 22 of device 10.

Second housing portion 72 forms plural edges 74 of device 10. In the preferred embodiment, second housing portion 72 includes a lateral periphery 75. Periphery 75 of second housing 72 corresponds to lateral periphery 21 of device 10 in the depicted embodiment. In particular, periphery 75 of second housing 72 extends to device periphery 21 in the preferred embodiment. In such a configuration, periphery 75 is coincident with periphery 21 of device 10.

Referring to FIG. 8, first housing portion 71 and second housing portion 72 comprising different materials are illustrated over substrate 20. First and second materials overlap one another and form a substantially solid device 10 with substrate 20. In particular, substrate 20, housing 70 including housing portions 71, 72, and internal components and circuitry form a solid device 10. First housing portion 71 is depicted encapsulating a portion of antenna 34, terminal 36, connector 37, power source 52 and integrated circuit 54 in FIG. 8. Power source 52 is shown coupled with terminal 36. Second housing portion 72 is shown encapsulating first housing portion 71.

Second housing portion 72 is configured to have increased flexibility with respect to first housing portion 71 in the described embodiment. As such, first housing portion 71 preferably has a flexural modulus different than a flexural modulus of second housing portion 72. More specifically, second housing portion 72 has a flexural modulus less than a flexural modulus of first housing portion 71. For example, first housing portion 71 is configured in one embodiment to have a flexural modulus within an approximate range of 3,500 MPa to 20,000 MPa. Second housing portion 72 is configured in the described embodiment to have a flexural modulus within an approximate range of 20 MPa to 3,500 MPa. Flexural properties of materials are described in *Standard Test Methods of Flexural Properties of Unreinforced and Reinforced Plastics and Electrical Insulating Materials (METRIC)*, ASTM standard designation D 790M, American Society for Testing and Materials, pages 398–410, incorporated herein by reference. Preferably, the material comprising second housing portion 72 has increased flexibility compared with the material comprising first housing portion 71.

Figure 9:
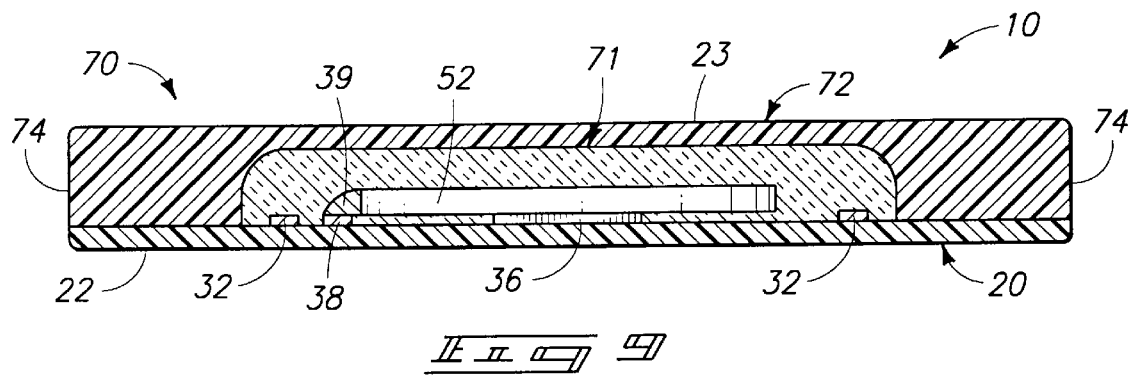
FIG. 9 is a cross-sectional view, taken along line 9—9, of the wireless communication device shown in FIG. 7.

Referring to FIG. 9, first housing portion 71 and second housing portion 72 are shown in another cross-sectional view of device 10. Power source 52 of device 10 is shown coupled with terminal connection 38 via a conductive epoxy connection 39. Transmit antenna 32 is also depicted radially outward of power source 52.

Figure 10:
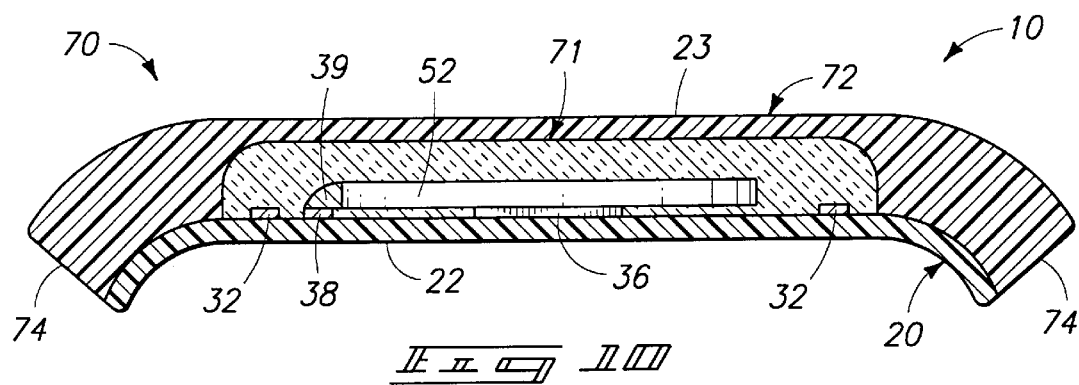
FIG. 10 is a cross-sectional view of the wireless communication device of FIG. 9 in a flexed position.

Referring to FIG. 10, increased flexibility of second housing portion 72 with respect to first housing portion 71 is illustrated. External or outward portions of device 10, including second housing portion 72, are more easily deflected or deformed compared with first housing portion 71 as a result of application of external forces upon housing 70. Flexibility of substrate 20 is also illustrated in FIG. 10 wherein portions of substrate 20 adjacent second housing portion 72 are also deformed with second housing portion 72. The illustrated first housing portion 71 comprises a substantially rigid member which retains its shape and resists flexing during deformation of second housing portion 72.

Figure 11:
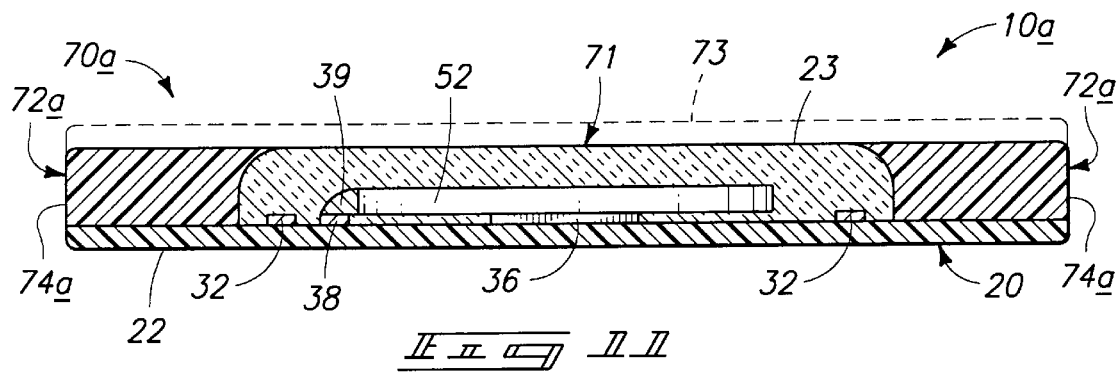
FIG. 11 is a cross-sectional view of another housing configuration of the wireless communication device.

Referring to FIG. 11, another housing configuration of device 10a is illustrated. The depicted housing 70a includes first housing portion 71 and second housing portion 72a comprising different materials. In the embodiment of device 10a depicted in FIG. 11, second housing portion 72a is provided substantially entirely laterally of first housing portion 71.

In particular, first housing portion 71 can be initially formed upon substrate 20. Thereafter, second housing portion 72a can be provided over substrate 20 and first housing portion 71 after housing portion 71 has sufficiently cured. Following curing of second housing portion 72a, a top portion 73 (illustrated in phantom) of second housing portion 72a can be removed by sanding or other removal method to form the housing configuration 70a shown in FIG. 11. Such removal of portion 73 provides second housing portion 72a having a predetermined thickness. In particular, edges 74a have a decreased height compared with edges 74 of housing 70 shown in FIG. 8–FIG. 10.

Figure 12:
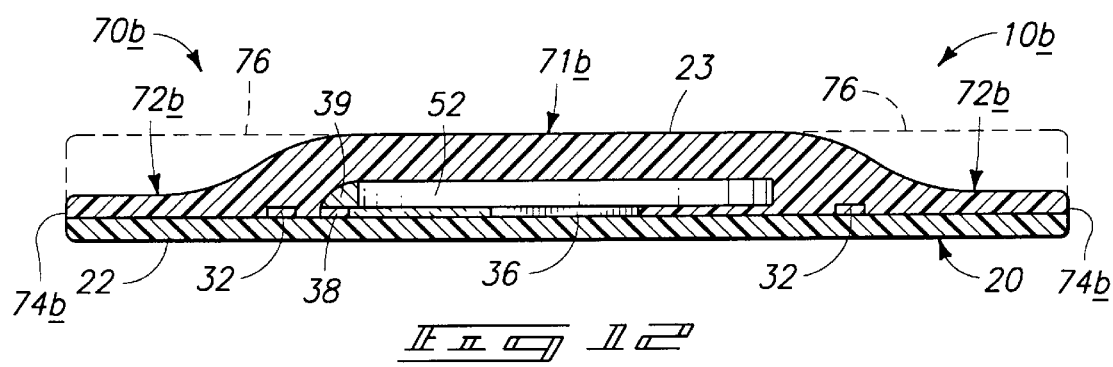
FIG. 12 is a cross-sectional view of yet another housing configuration of the wireless communication device.

Referring to FIG. 12, another housing configuration 70b of wireless communication device 10b is illustrated. Housing 70b includes first housing portion 71b and second housing portion 72b comprising the same material. In the depicted embodiment, first housing portion 71b has a first thickness and second housing portion 72b has a second thickness less than the first thickness. Such a configuration provides second housing portion 72b having increased flexibility with respect to first housing portion 71b. In particular, the depicted second housing portion 72b has a flexular modulus less than a flexular modulus of first housing portion 71b. One method of forming housing 70b depicted in FIG. 12 comprises forming a single encapsulant layer. Following curing of the encapsulant layer, plural portions 76 of the layer (shown in phantom) are removed providing first housing portion 71b and second housing portion 72b. Depicted edges 74b have a decreased height compared with edges 74a of housing 70a shown in FIG. 11.

In compliance with the statute, the invention has been described in language more or less specific as to structural and methodical features. It is to be understood, however, that the invention is not limited to the specific features shown and described, since the means herein disclosed comprise preferred forms of putting the invention into effect. The invention is, therefore, claimed in any of its forms or modifications within the proper scope of the appended claims appropriately interpreted in accordance with the doctrine of equivalents.

I claim:

1. A wireless communication device comprising:
    a substrate having a length;
    communication circuitry supported by the substrate; and
    a housing over at least a portion of the substrate and comprising: a substantially rigid first housing portion over the communication circuitry and a predominate portion of the length of the substrate; and a second housing portion over at least a portion of the substrate laterally adjacent the first housing portion and configured to have increased flexibility with respect to the first housing portion.

2. The wireless communication device according to claim 1 wherein the wireless communication device comprises a remote intelligent communication device.

3. The wireless communication device according to claim 1 wherein the wireless communication device comprises a radio frequency identification device.

4. The wireless communication device according to claim 1 wherein at least a portion of the second housing portion is provided over at least a portion of the first housing portion.

5. The wireless communication device according to claim 1 wherein the second housing portion is provided over substantially the entire substrate.

6. The wireless communication device according to claim 1 wherein the first housing portion encapsulates at least a portion of the communication circuitry and the second housing portion encapsulates the first housing portion.

7. The wireless communication device according to claim 1 further comprising a battery and the communication circuitry comprises transponder circuitry, and the first housing portion encapsulates the battery and the transponder circuitry.

8. The wireless communication device according to claim 1 wherein the first housing portion has a flexural modulus within an approximate range of 3,500 MPa to 20,000 MPa, and the second housing portion has a flexural modulus within an approximate range of 20 MPa to 3,500 MPa.

9. The wireless communication device according to claim 1 wherein the second housing portion is provided substantially entirely laterally of the first housing portion.

10. The wireless communication device according to claim 1 wherein the first housing portion and the second housing portion comprise different first and second materials, and the first and second materials overlap one another.

11. The wireless communication device according to claim 1 wherein the first housing portion, second housing portion and substrate form a substantially solid device.

12. The wireless communication device according to claim 1 wherein the second housing portion forms plural edges of the device.

13. The wireless communication device according to claim 1 further comprising a lateral periphery, and wherein the second housing portion extends to the lateral periphery of the device.

14. The wireless communication device according to claim 1 further comprising a device periphery, and wherein the second housing portion comprises a lateral periphery which is coincident with the device periphery.

15. The wireless communication device according to claim 1 wherein the first housing portion has a first thickness and the second housing portion has a second thickness less than the first thickness.

16. The wireless communication device according to claim 15 wherein the first housing portion and the second housing portion comprise the same material.

17. A wireless communication device comprising:
a substrate;
a battery supported by the substrate;
communication circuitry supported by the substrate and coupled with the battery;
a first housing portion having a first flexural modulus and provided over the communication circuitry and the battery and a predominate portion of the substrate; and
a second housing portion having a second flexural modulus different than the first flexural modulus and provided over at least a portion of the substrate laterally adjacent the first housing portion.

18. The wireless communication device according to claim 17 wherein the wireless communication device comprises a remote intelligent communication device.

19. The wireless communication device according to claim 17 wherein the wireless communication device comprises a radio frequency identification device.

20. The wireless communication device according to claim 17 wherein the first housing portion encapsulates at least a portion of the communication circuitry and the second housing portion encapsulates the first housing portion.

21. The wireless communication device according to claim 17 wherein the communication circuitry comprises transponder circuitry, and the first housing portion encapsulates the battery and the transponder circuitry.

22. The wireless communication device according to claim 17 wherein the flexural modulus of the first housing portion is within an approximate range of 3,500 MPa to 20,000 MPa, and the flexural modulus of the second housing portion is within an approximate range of 20 MPa to 3,500 MPa.

23. The wireless communication device according to claim 17 wherein the first housing portion has a first thickness and the second housing portion has a second thickness less than the first thickness.

24. The wireless communication device according to claim 17 wherein the second housing portion is provided over at least a portion of the first housing portion.

25. A radio frequency identification device comprising:
a substrate;
communication circuitry supported by the substrate and including an integrated circuit and a conductive trace including at least one antenna coupled with the integrated circuit;
a first housing portion having a first flexural modulus and provided over the integrated circuit and the conductive trace of the communication circuitry and a predominate portion of the substrate; and
a second housing portion having a second flexural modulus less than the first flexural modulus, the second housing portion being provided over at least a portion of the substrate laterally adjacent the first housing portion.

26. The radio frequency identification device according to claim 25 wherein the first housing portion has a flexural modulus within an approximate range of 3,500 MPa to 20,000 MPa, and the second housing portion has a flexural modulus within an approximate range of 20 MPa to 3,500 MPa.

27. The radio frequency identification device according to claim 25 wherein the first housing portion encapsulates at least a portion of the communication circuitry including the integrated circuit, and the second housing portion encapsulates the first housing portion.

28. The radio frequency identification device according to claim 27 further comprising a battery and the first housing portion encapsulates the battery.

29. The wireless communication device according to claim 25 wherein the second housing portion is provided over at least a portion of the first housing portion.

30. A radio frequency identification device comprising:
a substrate having a length;
transponder circuitry supported by the substrate;
a first housing portion having a first flexural modulus and provided over the transponder circuitry and over a predominate portion of the length of the substrate; and
a second housing portion having a second flexural modulus less than the first flexural modulus, the second housing portion being provided over at least a portion of the substrate laterally adjacent the first housing portion.

31. The radio frequency identification device according to claim 30 wherein the first housing portion encapsulates the transponder circuitry and the second housing portion encapsulates the first housing portion.

32. The radio frequency identification device according to claim 30 wherein the first housing portion has a flexural modulus within an approximate range of 3,500 MPa to 20,000 MPa, and the second housing portion has a flexural modulus within an approximate range of 20 MPa to 3,500 MPa.

33. The wireless communication device according to claim 30 wherein the second housing portion is provided over at least a portion of the first housing portion.

34. A method of forming a wireless communication device, the method comprising:
providing a substrate having a length;
providing communication circuitry over the substrate; and
forming a housing over the substrate and comprising a substantially rigid first housing portion over a predominate portion of the length of the substrate and over the communication circuitry and a second housing portion over at least a portion of the substrate laterally adjacent the first housing portion and having increased flexibility with respect to the first housing portion.

35. The method according to claim 34 wherein the providing communication circuitry comprises providing transponder circuitry configured to output an identification signal responsive to receiving an interrogation signal.

36. The method according to claim 34 wherein the providing communication circuitry comprises:
printing circuitry over the substrate; and
coupling transponder circuity with the printed circuitry.

37. The method according to claim 36 further comprising connecting the printed circuitry and the transponder circuitry using a plurality of connectors.

38. The method according to claim 37 wherein the forming comprises encapsulating the connectors using the first housing portion.

39. The method according to claim 34 wherein the forming comprises encapsulating at least a portion of the communication circuitry using the first housing portion.

40. The method according to claim 34 wherein the forming comprises encapsulating the first housing portion using the second housing portion.

41. The method according to claim 34 wherein the forming comprises form ing the first housing portion hav ing a flexural modulus within the range of 3,500 MPa to 20,000 MPa and forming the second housing portion having a flexural modulus within the range of 20 MPa to 3,500 MPa.

42. The method according to claim 34 wherein the forming comprises forming the housing over substantially the entire substrate.

43. The method according to claim 34 wherein the forming provides a substantially solid device including the substrate and the housing.

44. The method according to claim 34 wherein the forming comprises forming the second housing portion over at least a portion of the first housing portion.

45. A method of forming a wireless communication device, the method comprising:
providing a substrate;
providing communication circuitry over the substrate;
coupling a battery with the communication circuitry;
forming a first housing portion over of the communication circuitry and the battery and having a first flexural modulus; and
forming a second housing portion over at least a portion of the substrate laterally adjacent the first housing portion and having a second flexural modulus different than the first flexural modulus.

46. The method according to claim 45 wherein the providing communication circuitry comprises providing transponder circuitry configured to output an identification signal responsive to receiving an interrogation signal.

47. The method according to claim 45 wherein the providing communication circuitry comprises:
printing circuitry over the substrate; and
coupling transponder circuity with the printed circuitry.

48. The method according to claim 45 wherein the forming the first housing portion comprises encapsulating at least a portion of the communication circuitry.

49. The method according to claim 45 wherein the forming the second housing portion comprises encapsulating the first housing portion.

50. The method according to claim 45 wherein the formings comprise forming a second housing portion having increased flexibility with respect to the first housing portion.

51. The method according to claim 45 wherein the formings comprise forming the first housing portion having a flexural modulus within the range of 3,500 MPa to 20,000 MPa and forming the second housing portion having a flexural modulus within the range of 20 MPa to 3,500 MPa.

52. The method according to claim 45 wherein the forming the second housing portion comprises forming the second housing portion over at least a portion of the first housing portion.

53. A method of forming a wireless communication device, the method comprising:
providing a substrate;
providing communication circuitry over the substrate;
first encapsulating the communication circuitry with a first encapsulant layer having a first flexural modulus, and wherein the first encapsulant layer is provided over a predominate portion of the substrate; and
second encapsulating the first encapsulating layer with a second encapsulant layer having a second flexural modulus different than the first flexural modulus of the first encapsulant layer, the second encapsuling providing the second encapsulant layer over the substrate laterally adjacent the first encapsulant layer.

54. The method according to claim 53 wherein the providing communication circuitry comprises providing transponder circuitry configured to output an identification signal responsive to receiving an interrogation signal.

55. The method according to claim 53 wherein the providing communication circuitry comprises:
printing circuitry over the substrate; and
coupling transponder circuity with the printed circuitry.

56. The method according to claim 53 wherein the second encapsulating comprises forming a second encapsulant layer having a second flexural modulus less than the first flexural modulus of the first encapsulant layer.

57. Eke method according to claim 53 wherein the second encapsulating forms a substantially solid device including the substrate, the first encapsulant layer and the second encapsulant layer.

58. A method of forming a radio frequency identification device, the method comprising:

providing a substrate;

providing communication circuitry including transponder circuitry and circuitry coupled with the transponder circuitry over the substrate;

first encapsulating the communication circuitry with a first encapsulant layer having a first flexural modulus, and wherein the first encapsulant layer is provided over a predominate portion of the substrate; and second encapsulating the first encapsulant layer with a second encapsulant layer having a second flexural modulus different than the first flexural modulus, the second encapsulating providing the second encapsulant layer over the substrate laterally adjacent the first encapsulant layer.

59. The method according to claim 58 wherein the second encapsulating comprises forming a second encapsulant layer having a second flexural modulus less than the first flexural modulus of the first encapsulant layer.

60. The method according to claim 58 wherein the second encapsulating forms a substantially solid device including the substrate, the first encapsulant layer and the second encapsulant layer.

61. A method of forming a radio frequency identification device comprising:

providing a flexible substrate having a support surface;

printing a conductive trace comprising a plurality of terminal connections, a plurality of connectors, and first and second antennas over the support surface, the first antenna being configured to transmit wireless signals and the second antenna being configured to receive wireless signals;

conductively bonding a battery with the terminal connections;

conductively bonding transponder circuitry with the connectors and the first and second antennas;

first encapsulating the battery, the transponder circuitry, the terminal connections, and the connectors with a substantially rigid first encapsulant layer having a first flexural modulus within an approximate range of 3.500 MPa to 20,000 MPa, and wherein the first encapsulant layer is provided over a predominate portion of the substrate;

second encapsulating the first encapsulant layer with a second encapsulant layer having increased flexibility with respect to the first encapsulant layer and having a second flexural modulus within an approximate range of 20 MPa to 3,500 MPa, the second encapsulating forms a substantially solid device including the substrate, the first encapsulant layer and the second encapsulant layer, and the second encapsulating providing the second encapsulant layer over the substrate laterally adjacent the first encapsulant layer, and removing at least some of the second encapsulant layer providing a second encapsulant layer having a predetermined thickness.

* * * * *

UNITED STATES PATENT AND TRADEMARK OFFICE
CERTIFICATE OF CORRECTION

PATENT NO. : 6,031,459
DATED : February 29, 2000
INVENTOR(S) : Rickie C. Lake

It is certified that error appears in the above-identified patent and that said Letters Patent is hereby corrected as shown below:

Col. 11, line 58
replace "form ing "
with --forming --.

Col. 12, line 10
replace "of"
with --at--.

Col. 13, line 5
replace "Eke"
with --The--.

Col. 11, line 58
replace "hav ing"
with --having--.

Signed and Sealed this

Twentieth Day of February, 2001

Attest:

NICHOLAS P. GODICI

Attesting Officer

Acting Director of the United States Patent and Trademark Office